US012401528B2

(12) United States Patent
De Hoogh

(10) Patent No.: US 12,401,528 B2
(45) Date of Patent: Aug. 26, 2025

(54) AUTHENTICATION SYSTEM WITH REDUCED ATTACK SURFACE

(71) Applicant: KONINKLIJKE PHILIPS N.V., Eindhoven (NL)

(72) Inventor: Sebastiaan Jacobus Antonius De Hoogh, Noord Brabant (NL)

(73) Assignee: Koninklijke Philips N.V., Eindhoven (NL)

( * ) Notice: Subject to any disclaimer, the term of this patent is extended or adjusted under 35 U.S.C. 154(b) by 1040 days.

(21) Appl. No.: 17/421,030

(22) PCT Filed: Jan. 3, 2020

(86) PCT No.: PCT/EP2020/050075
§ 371 (c)(1),
(2) Date: Jul. 7, 2021

(87) PCT Pub. No.: WO2020/144110
PCT Pub. Date: Jul. 16, 2020

(65) Prior Publication Data
US 2022/0070009 A1    Mar. 3, 2022

(30) Foreign Application Priority Data
Jan. 9, 2019  (EP) .................... 19150995

(51) Int. Cl.
*H04L 9/32*    (2006.01)
(52) U.S. Cl.
CPC .............. *H04L 9/3271* (2013.01)

(58) Field of Classification Search
CPC ............ H04L 9/3271; H04L 2209/42; H04L 2209/46; H04L 2209/76; H04L 9/3234; H04L 9/085; H04L 9/3013
See application file for complete search history.

(56) References Cited

U.S. PATENT DOCUMENTS

| | | | | |
|---|---|---|---|---|
| 4,926,480 A | * | 5/1990 | Chaum | ............ G06Q 20/40975 |
| | | | | 235/382 |
| 4,947,430 A | * | 8/1990 | Chaum | ................. G07F 7/1016 |
| | | | | 713/180 |
| 5,276,737 A | * | 1/1994 | Micali | .................... G06Q 20/02 |
| | | | | 380/286 |

(Continued)

FOREIGN PATENT DOCUMENTS

JP    6585038 B2 * 10/2019 ............ G06F 21/42

OTHER PUBLICATIONS

Verheul, E.R., Jacobs, B., Meijer, C., Hildebrandt, M., & Ruiter, J.D. (2016). Polymorphic Encryption and Pseudonymisation for Personalised Healthcare. IACR Cryptol. ePrint Arch., 2016, 411 (Year: 2016).*

(Continued)

*Primary Examiner* — John B King

(57) ABSTRACT

Some embodiments are directed to an authentication system (100; 101; 102) for computing an authentication token for a service provider to authenticate a user system to the service provider, the authentication system comprising a processor configured to jointly blind with a user system an encrypted user identity and to compute an encrypted identity for the service provider from the blinded encrypted user identity.

12 Claims, 7 Drawing Sheets

(56) References Cited

U.S. PATENT DOCUMENTS

| | | | | |
|---|---|---|---|---|
| 5,521,980 | A * | 5/1996 | Brands | H04L 9/3257 713/180 |
| 5,604,805 | A * | 2/1997 | Brands | G06Q 20/381 380/28 |
| 6,202,150 | B1 * | 3/2001 | Young | H04L 9/0894 713/168 |
| 8,077,863 | B2 * | 12/2011 | Hosaka | H04L 9/085 713/160 |
| 2004/0073814 | A1 * | 4/2004 | Miyazaki | H04L 9/3271 726/6 |
| 2005/0120205 | A1 * | 6/2005 | Umezawa | H04L 9/3263 713/156 |
| 2005/0283608 | A1 * | 12/2005 | Halcrow | H04L 63/0823 713/175 |
| 2007/0044143 | A1 * | 2/2007 | Zhu | G06F 21/33 726/8 |
| 2007/0101145 | A1 * | 5/2007 | Sachdeva | H04L 63/12 713/176 |
| 2008/0095375 | A1 * | 4/2008 | Tateoka | H04L 9/085 380/282 |
| 2008/0243703 | A1 * | 10/2008 | Al-Herz | G06Q 20/3678 705/69 |
| 2009/0182673 | A1 * | 7/2009 | Al-Herz | G06Q 20/3678 705/69 |
| 2010/0199098 | A1 * | 8/2010 | King | H04L 9/3213 713/182 |
| 2011/0252229 | A1 * | 10/2011 | Belenkiy | H04L 63/083 726/5 |
| 2011/0314280 | A1 * | 12/2011 | Nonaka | H04L 9/0822 713/168 |
| 2012/0084565 | A1 * | 4/2012 | Wittenberg | H04L 9/3226 713/172 |
| 2015/0332064 | A1 * | 11/2015 | Camenisch | G06F 21/6254 713/164 |
| 2017/0228371 | A1 * | 8/2017 | Seger, II | H04L 9/3239 |
| 2018/0351752 | A1 * | 12/2018 | Wallrabenstein | H04L 9/002 |
| 2019/0138753 | A1 * | 5/2019 | Wallrabenstein | G09C 1/00 |
| 2021/0336792 | A1 * | 10/2021 | Agrawal | H04L 9/085 |
| 2022/0405800 | A1 * | 12/2022 | Walcott | H04L 63/0407 |

OTHER PUBLICATIONS

Verheul, E.R. (2015). Privacy protection in electronic education based on polymorphic pseudonymization. IACR Cryptol. ePrint Arch., 2015, 1228 (Year: 2015).*

Verheul, E.R., Jacobs, B (2017) Polymorphic encryption and pseudonymisation in identity management and medical research NAW 5/18 nr. Sep. 3, 2017 (Year: 2017).*

EU commission.: Regulation (EU) No. 910/2014 Of the European Parliament and of the Council of Jul. 23, 2014 on electronic identification and trust services for electronic transactions in the internal market and repealing Directive 1999/93/EC.

Rijksoverheid.nl.: Uniforme set van eisen 1.0. https://www.rijksoverheid.nl/documenten/rapporten/2016/12/15/uniforme-set-van-eisen, 2016.

Eric Verheul.: Privacy protection in electronic education based on polymorphic pseudonymization, Cryptology ePrint Archive: Report 2015/1228.

A. Fiat and A. Shamir. How to prove yourself: Practical solutions to identification and signature problems. In Advances In Cryptology—CRYPTO '86, vol. 263 of LNCS, pp. 186-194, New York, 1987. Springer.

L.A.M Schoenmakers.: Lecture Notes Cryptographic Protocols Version 1.6, http://www.win.tue.nl/~berry/CryptographicProtocols/LectureNotes.pdf Jan. 30, 2021.

Eric Verheul et al: Polymorphic Encryption and Pseudonymisation for Personalised Healthcare International Association for Cryptologic Research, vol. 20160428:155559, Apr. 26, 2016 (Apr. 26, 2016), pp. 1-61.

International Search Report and Written Opinion from PCT/EP2020/050075 mailed Jul. 16, 2020.

* cited by examiner

AUTHENTICATION SYSTEM WITH REDUCED ATTACK SURFACE

CROSS-REFERENCE TO PRIOR APPLICATIONS

This application is the U.S. National Phase application under 35 U.S.C. § 371 of International Application No. PCT/EP2020/050075, filed on Jan. 3, 2020, which claims the benefit of EP Patent Application No. EP 19150995.9, filed on Jan. 9, 2019. These applications are hereby incorporated by reference herein.

FIELD OF THE INVENTION

The invention relates to an authentication system, user system, helper server, authentication server, service provider, first user device, second user device, an authentication method, a user method, an authentication method for an authentication server, an authentication method for a helper server, a user method for a first user device, a user method for a second user device.

BACKGROUND OF THE INVENTION

The Dutch government has published guidelines with security requirements for an Authentication Service for each eIDAS security level [2]. In the European regulation "Electronic Identification And Trust Services" (eIDAS [1]), the security of digital identity is defined. One of its foundations is the "Privacy by Design" principle, that minimizes privacy sensitive tracing information. Polymorphic Pseudonyms (referred to as PP, [3]) are used as a cryptographic primitive to identify individuals.

The guidelines claim that its scheme has no privacy hotspots, since the data on the servers are just encryptions. However, these encryptions are essentially identifiable access tokens that can be stolen and abused by attackers without having to launch an attack against a specific individual. This makes that the authentication server a single point of security breach for such an attacker.

The guidelines propose a solution to this by means of storing the pseudonym on some external smartcard that is given to the corresponding Identity Owner. Up to a point, this may mitigate the above attack with respect to stored PPs. However, an attacker can simply wait on the Authentication Server for the PPs to arrive.

Moreover, when a user has to authenticate to the authentication server, in addition to sending his PP, the user also need to indicate to whom he wants to authenticate. This leads to profiling information on the server. In other words, from a privacy point of view, authentication servers are a risk factor too.

The references below are included herein by reference:
[1] EU commission.: *REGULATION (EU) No 910/2014 OF THE EUROPEAN PARLIAMENT AND OF THE COUNCIL of 23 Jul. 2014 on electronic identification and trust services for electronic transactions in the internal market and repealing Directive* 1999/93/EC
[2] rijksoverheid.nl.: Uniforme set van eisen 1.0. https://www.rijksoverheid.nl/documenten/rapporten/2016/12/15/uniforme-set-van-eisen, 2016
[3] Eric Verheul.: *Privacy protection in electronic education based on polymorphic pseudonymization*, Cryptology ePrint Archive: Report 2015/1228
[4] A. Fiat and A. Shamir. *How to prove yourself: Practical solutions to identification and signature problems*. In Advances in Cryptology-CRYPTO '86, volume 263 of LNCS, pages 186-194, New York, 1987. Springer.
[5] L. A. M Schoenmakers.: *Lecture Notes Cryptographic Protocols Version* 1.32, http://www.win.tue.nl/~berry/CryptographicProtocols/LectureNotes.pdf

SUMMARY OF THE INVENTION

There are several drawbacks to the known authentication method and server. For example, it is relatively easy for an attacker to obtain an encrypted user identity, since they are present on each user device. A compromised encrypted user identity may in turn lead to identity theft. Even if one were to take into account that an encryption in a probabilistic scheme such as ElGamal could take many forms (one for each value r that is used in the encryption), there remains the risk that if just one of those forms is stolen by an attacker, he can impersonate the corresponding user. Having just one of the many possible encrypted identities is sufficient to impersonate a user since they all decrypt to the identity of the user.

In the known system, whether a smartcard is used or not, the Authentication Server will at some moment in time possess an encrypted identity to be able to transform it for the corresponding service provider. Hence, an adversary has to break just the Authentication Server to collect PP's. He can then impersonate the corresponding user since he controls the authentication system. In fact, breaking into the authentication server gives the possibility of collecting many encrypted identities. In other words, the authentication is a single-point of breach.

Another problem with the known system is that a user's activity can be profiled by tracking his encrypted identity. While [2] claims to be a scheme without a "privacy hotspot", if their Authentication Server is responsible for verifying authentication data of a certain user indexed by at least his authentication data (e.g., a derivation of a PIN, OTP-key . . . ) and forwarding the corresponding EP to the service provider, then the Authentication Server can distinguish between individuals and trace which service providers a certain user visits. In other words, the Authentication Server from [2] does not learn immediately the identity of the user and his behavior, but it still can collect profiling information and learn a lot about the identity of each user. The OTP-key may be an HMAC-based One-time Password algorithm (HOTP), e.g., a one-time password (OTP) algorithm based on HMAC, e.g., as used in the Initiative for Open Authentication (OATH).

Authentication systems are proposed that address these and other concerns. Embodiments are proposed in which a generic encrypted identity never needs to be in memory; neither at the user system nor at the authentication system. Embodiments are also proposed in with profiling information is much reduced. In particular, there may remain a server that could still keep track of some information, e.g., of the fact that some user accesses some website, though without knowing which website, or even if it is the same or a different website; while another server may know which servers are accessed but without having information associated with a user. Accordingly, the possibility for profiling is reduced to keeping track which servers, e.g., websites are popular, or which users, e.g. as indexed by some identifying information, though not their actual identity, often access services. This is a distinct improvement over the known system in which this information can easily be combined.

The invention can be implemented in an authentication system, user system and service provider. The former two may be implemented as a single device, or a combination of multiple cooperating devices, or as two distinct devices which share only predetermined parts of the authentication protocols. Aspects of the invention include: an authentication system, a user system, a service provider, an authentication server, a helper server, a first user device, a second user device, and methods to operate and/or enroll any of these systems and devices.

The various devices may be electronic devices. In particular, some or all of the devices in the user system may be mobile electronic devices, e.g., a mobile phone, tablet or the like. For example, the authentication system and user system may be implemented by one or more devices or subsystems. The helper server, authentication server, service provider, first user device, and second user device may be implemented as a device, e.g., a computer, a server, etc.; they could also be implemented as multiple cooperating devices. The authentication method, user method, authentication method for an authentication server, authentication method for a helper server, user method for a first user device, a user method for a second user device may be implemented as electronically implemented methods, e.g., computer-implemented methods, etc.

The methods described herein may be applied in a wide range of practical applications. Such practical applications include providing access to services, e.g., both government services and non-government services. These services may be provided with either an official identity, e.g., a social security number or the like, or with a pseudonym.

An embodiment of the method may be implemented on a computer as a computer implemented method, or in dedicated hardware, or in a combination of both. Executable code for an embodiment of the method may be stored on a computer program product. Examples of computer program products include memory devices, optical storage devices, integrated circuits, servers, online software, etc. Preferably, the computer program product comprises non-transitory program code stored on a computer readable medium for performing an embodiment of the method when said program product is executed on a computer.

In an embodiment, the computer program comprises computer program code adapted to perform all or part of the steps of an embodiment of the method when the computer program is run on a computer. Preferably, the computer program is embodied on a computer readable medium.

Another aspect of the invention provides a method of making the computer program available for downloading. This aspect is used when the computer program is uploaded into, e.g., Apple's App Store, Google's Play Store, or Microsoft's Windows Store, and when the computer program is available for downloading from such a store.

BRIEF DESCRIPTION OF THE DRAWINGS

Further details, aspects, and embodiments of the invention will be described, by way of example only, with reference to the drawings. Elements in the figures are illustrated for simplicity and clarity and have not necessarily been drawn to scale. In the Figures, elements which correspond to elements already described may have the same reference numerals. In the drawings, FIGS. 1a-1g schematically show examples of embodiments of authentication systems, user systems and of a service provider, FIG. 1h schematically shows an example of an embodiment of an authentication system, a user system, a service provider and a master system, FIG. 2 schematically shows an example of an embodiment of an authentication system, a user system, a service provider and a master system, FIG. 3 schematically shows an example of an embodiment of an authentication system, a user system, a service provider and a master system, FIG. 4 schematically shows an example of an embodiment of an authentication system, a user system, a service provider and a master system, FIG. 5 schematically shows an example of an embodiment of authentication methods, FIG. 6a schematically shows a computer readable medium having a writable part comprising a computer program according to an embodiment, FIG. 6b schematically shows a representation of a processor system according to an embodiment.

LIST OF REFERENCE NUMERALS, IN FIGS. 1a-4, 6a-6b 13 a memory
14 a processor
15 a communication interface
100, 101, 102 an authentication system
103 a service and authentication system
110 a first share of an encrypted user identity
120 a joint blinding unit
130 an encrypted identity unit
150 a communication interface
170 an authentication server
180 a helper server
192 a computer network
200, 201, 202 a user system
210 a second share of the encrypted user identity
220 a joint blinding unit
250 a communication interface
270 a first user device
280 a second user device
300 a service provider
310 a challenge
400 a master system
1000 a computer readable medium
1010 a writable part
1020 a computer program
1100 a device
1110 a system bus
1120 a processor
1130 a memory
1140 a user interface
1150 a communication interface
1160 a storage
1161 an operating system
1162, 1163 instructions

DETAILED DESCRIPTION OF THE EMBODIMENTS

Figure 1A:
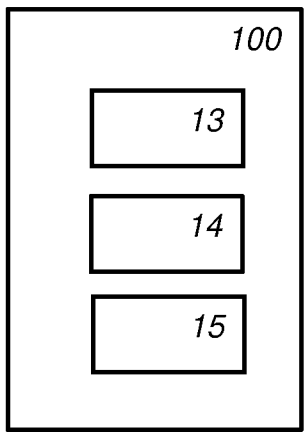

While this invention is susceptible of embodiment in many different forms, there are shown in the drawings and will herein be described in detail one or more specific embodiments, with the understanding that the present disclosure is to be considered as exemplary of the principles of the invention and not intended to limit the invention to the specific embodiments shown and described.

In the following, for the sake of understanding, elements of embodiments are described in operation. However, it will be apparent that the respective elements are arranged to perform the functions being described as performed by them.

Further, the invention is not limited to the embodiments, and the invention lies in each and every novel feature or combination of features described herein or recited in mutually different dependent claims.

In an embodiments, a user system is provided with an encrypted identity. This encrypted identity is generic, in the sense that it is not specific for any particular service provider. The generic encrypted identity would not be accepted by a service provider. A first cryptographic share of the encrypted identity is stored at the user system, while a second cryptographic share of the encrypted identity is stored at an authentication system. Together, the authentication system and the user system can derive a new encryption identity which is specific for a specific service provider. The computed specific encrypted identity will be accepted by the specific service provider for which it was created, though it may not be accepted by others. Typically, the user systems and the authentication systems are provided with generic encrypted identities, e.g., during an enrollment operation, before it is even known for which service providers they will be needed. In fact, which a service provider may not exist at the time a user system is enrolled.

The specific encrypted identity may be comprised in an authentication token that may allow the user system or some device of the user system access to the service provider's services. For example, the token may comprise further authentication data, e.g., a signature. For example, the authentication token may be provided to the service provider. The service provider may take the encrypted user identity from the authentication token when it receives it.

We assume that each user in the system has a unique identity, e.g., a unique number, e.g., a serial number or a social security number, etc. Some trusted organization may have access to a person's social security number, whereas others may only gain access to a pseudonym. A pseudonym may be different for different parties, e.g., for different organizations or websites, etc., but are constant for a particular service provider.

FIGS. 1a-1g schematically shows examples of embodiments of authentication systems, user systems and of a service provider.

Figure 1B:
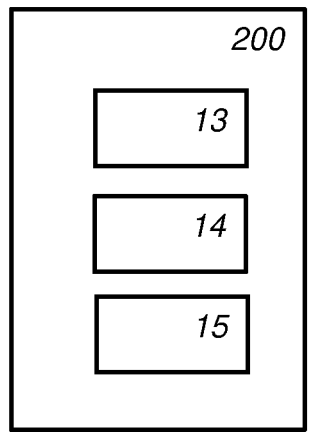
Figure 1C:
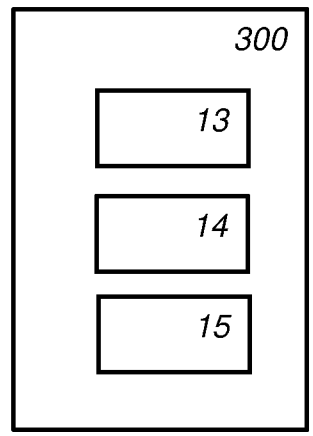
Figure 1D:
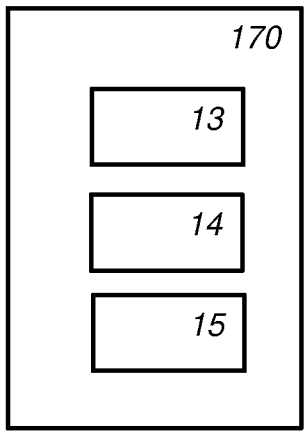
Figure 1E:
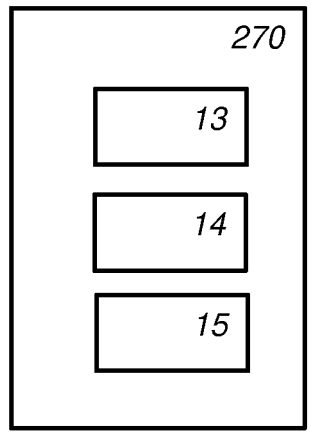
Figure 1F:
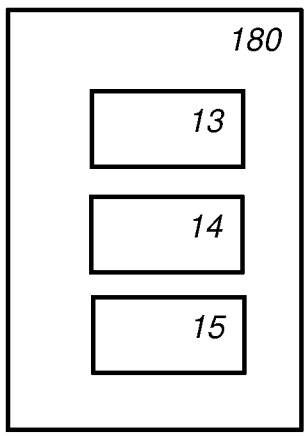
Figure 1G:
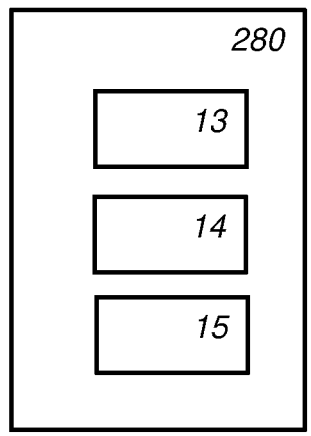

FIG. 1a schematically shows an example of an embodiment of an authentication system 100. FIG. 1b schematically shows an example of an embodiment of a user system 200. FIG. 1c schematically shows an example of an embodiment of a service provider 300.

The user system 200 may be used by a user to access the services of service provider 300. For example, service provider 300 may provide a digital service, e.g., over a computer network. For example, service provider 300 may comprise a web server, e.g., to display a website to the user of system 200. User system 200 may authenticate himself to service provider 300 using authentication system 100. For example, user system 200 may compute an authentication token together with authentication system 100 which is accepted by service provider 300. The authentication token enables service provider 300 to obtain an identity or pseudonym of the user. The authentication token may also comprise conventional authentication means. For example, in an embodiment the authentication token comprises a signature of authentication system 100, so that service provider 300 can verify that the token was generated by an authentic system 100. The latter implies that the user was accepted by the authentication server.

Any one of systems 100 and 200 may be embodied using multiple devices or with a single device. For example, in an embodiment, an authentication system may comprise an authentication server 170 and a helper server 180. For example, the helper server 180 may be configured to blind encrypted identities, while authentication system 170 may be configured to make a blinded encrypted identity specific to a particular service provider. For example, in an embodiment a user system may comprise a first user device 270 and a second user device 280. For example, first user device 270 may be configured to perform the actual authentication to service provider 300, and, e.g., to open a session with the authentication system, while second user device 280 may be configured to jointly compute the blinded encrypted identities, e.g., together with the helper server 180. In general, embodiment shown herein in which an authentication or user system is implemented in a single device may be adapted to an embodiment in which it is implemented as split over two or more devices, and vice versa.

Figure 2:
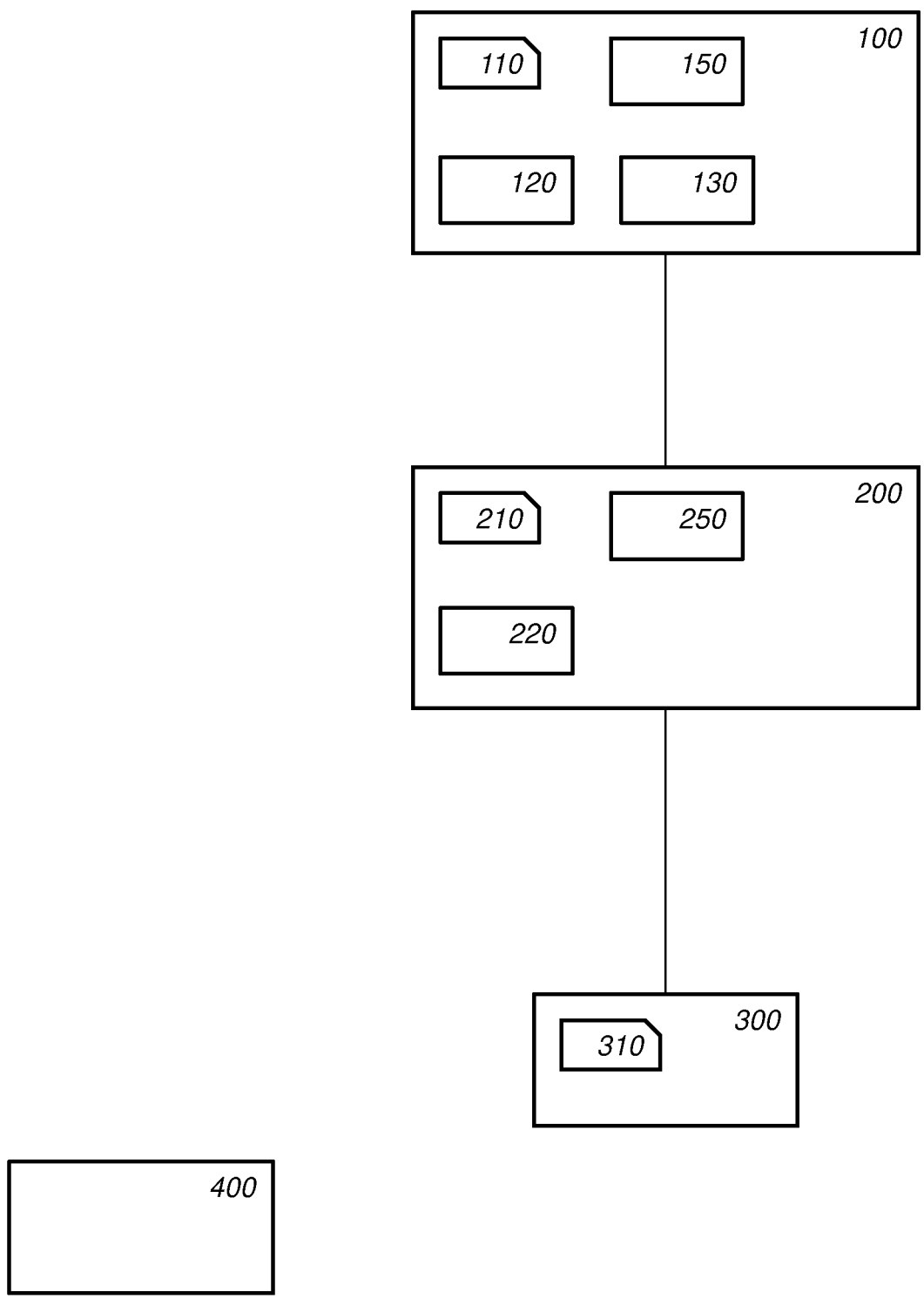
Figure 3:
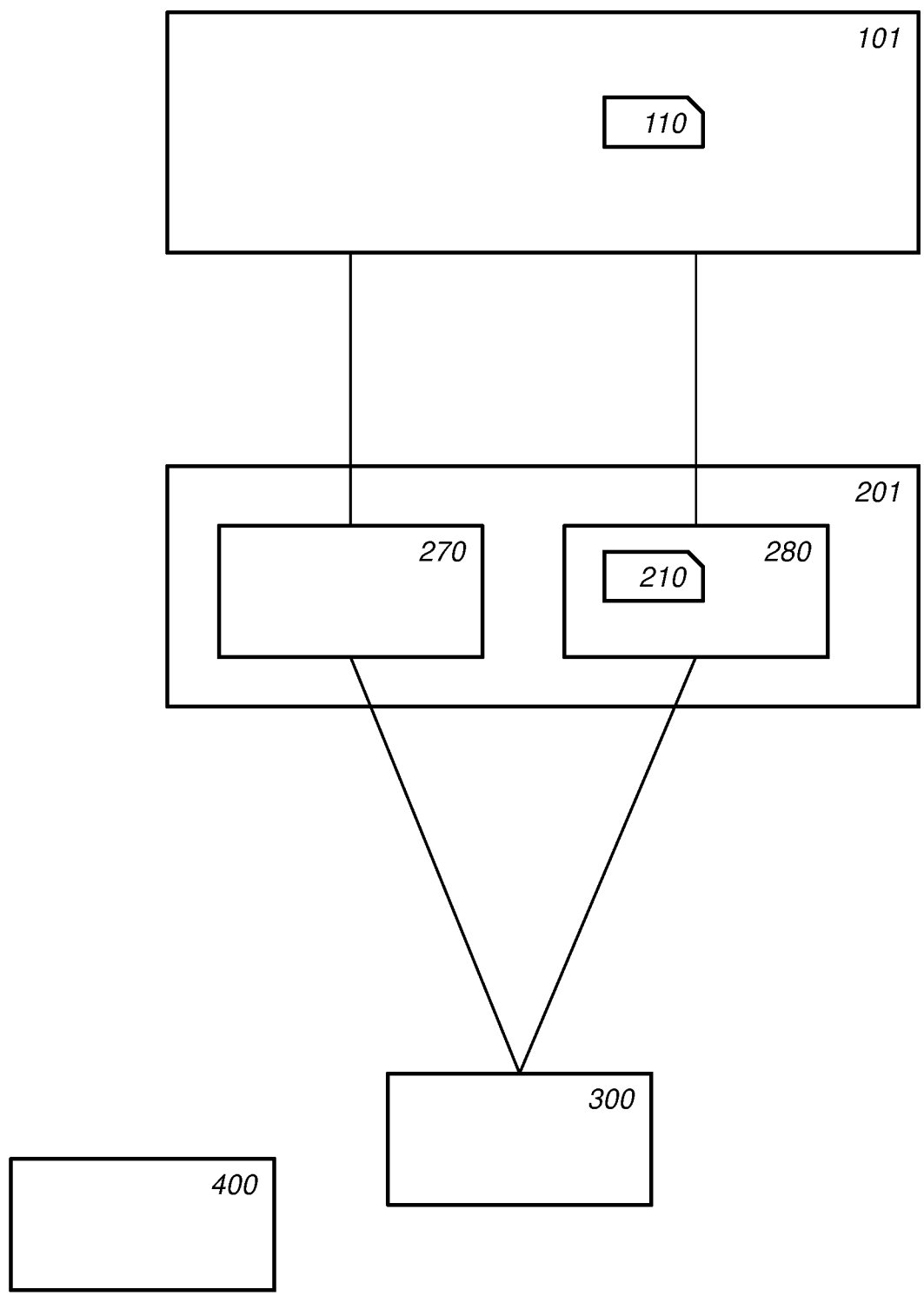
Figure 4:
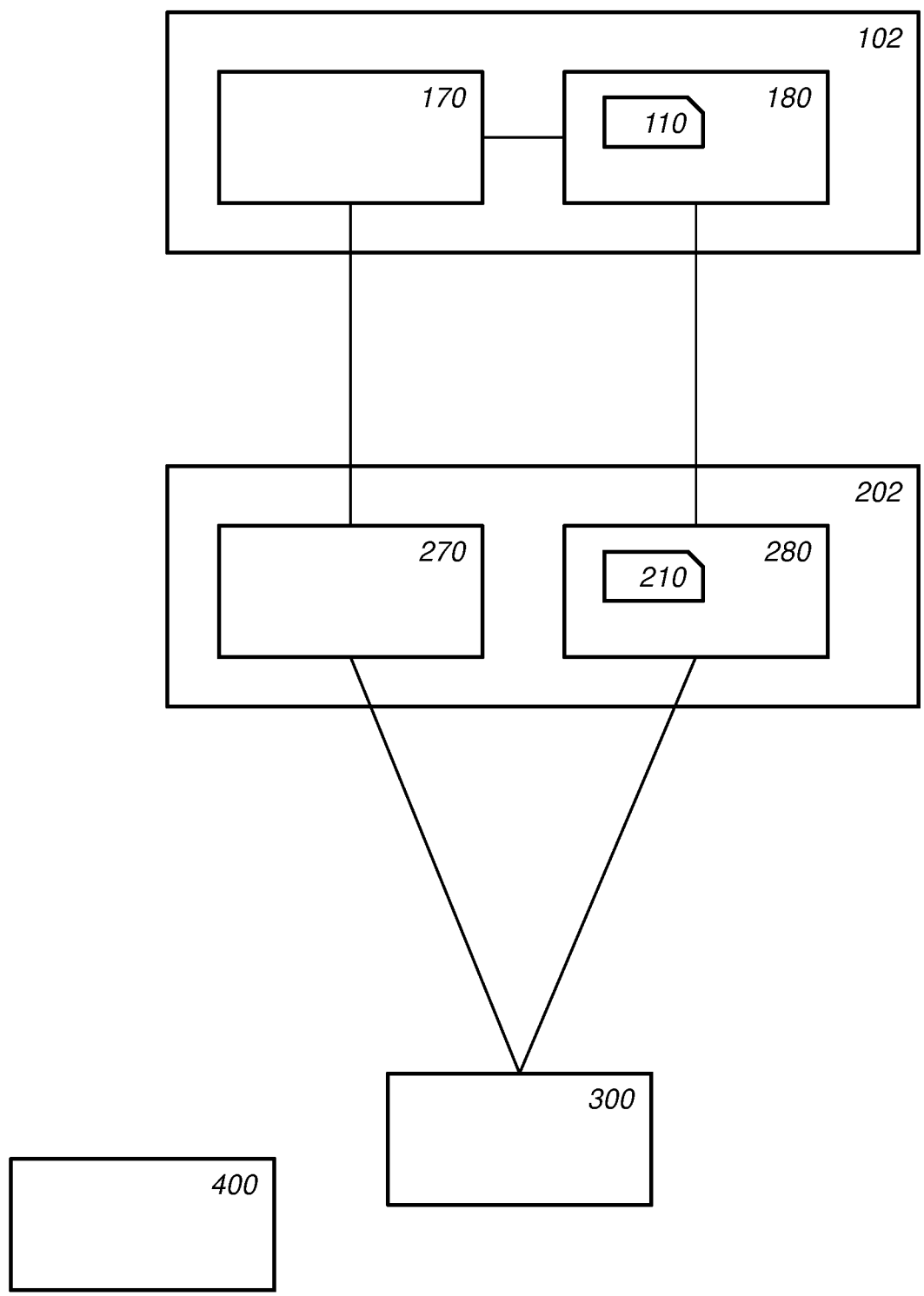

Accordingly, there are four combinations: The authentication system may be split over two devices but the user system is not (not separately shown). The authentication system is not split but the user system is (FIG. 3). The authentication system is not split and the user system is also not split (FIG. 2). The authentication system is split and the user system is also split (FIG. 4). In a split authentication system collecting profiling information is harder. In a split user system obtaining an encrypted identifier is harder for an attacker, e.g., because unblinded challenges and blinded encrypted identifiers need not exist on the same device or within the same software, not even temporarily.

Figure 1H:
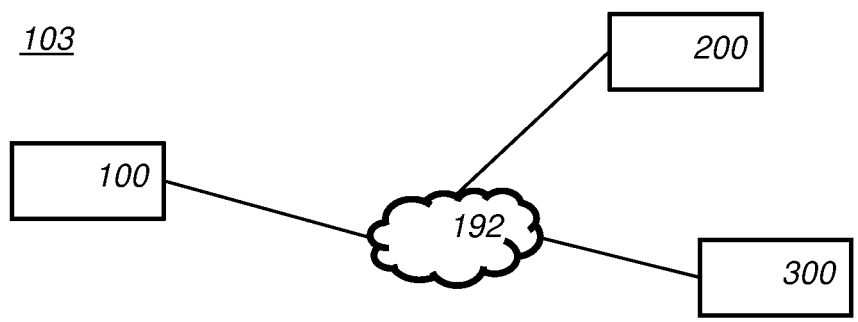

The various devices shown in FIGS. 1a-1g may communicate with each other over a computer network 192. For example, FIG. 1h shows authentication system 100, user system 200 and service provider 300 connected to computer network 192 together forming a service and authentication system 103. If authentication system 100 is split over multiple devices, then these may communicate between them using a computer network, possibly the same computer network, as well.

The computer network may be an internet, an intranet, a LAN, a WLAN, etc. Computer network 192 may be the Internet. The computer network may be wholly or partly wired, and/or wholly or partly wireless. For example, the computer network may comprise Ethernet connections. For example, the computer network may comprise wireless connections, such as Wi-Fi, ZigBee, and the like. The devices comprise a connection interface which is arranged to communicate with the other devices and systems as needed. For example, the connection interface may comprise a connector, e.g., a wired connector, e.g., an Ethernet connector, an optical connector, etc., or a wireless connector, e.g., an antenna, e.g., a Wi-Fi, 4G or 5G antenna. For example, the devices shown in FIGS. 1a-1g may comprise a communication interface 15. Computer network 192 may comprise additional elements, e.g., a router, a hub, etc. The communication interface 15 may be used to receive digital communication, e.g., in the form of one or more messages, e.g., sent and received in electronic form.

The execution of the devices shown in FIGS. 1a-1g is implemented in a processor circuit, examples of which are shown herein. The figures herein show functional units that may be functional units of the processor circuit. For example, FIGS. 2-4 may be used as a blueprint of a possible functional organization of the processor circuits. The processor circuit is not shown separate from the units in FIGS. 2-4. For example, the functional units shown may be wholly or partially implemented in computer instructions that are stored at a device, e.g., one of the devices of FIGS. 1a-1g, e.g., in an electronic memory 13, and are executable by a microprocessor 14. In hybrid embodiments, functional units are implemented partially in hardware, e.g., as coprocessors, e.g., crypto coprocessors, and partially in software stored and executed on processor 14. The communication established by a communication interface may be integrity and/or confidentiality protected using cryptography, e.g., using https, SSL, TLS.

FIG. 2 schematically shows an example of embodiments of an authentication system 100, a user system 200, a service provider 300 and a master system 400. As pointed out above splitting the authentication system and/or the user system brings various advantages. However, with respect to FIG. 2 these systems are described on the system level. Unsplit, or monolithic, embodiments, are also possible for authentication system 100 and user system 200.

Authentication system 100 comprises a storage storing a first share 110 of an encrypted user identity U. In a detailed embodiment disclosed below, the first share may be denoted as $PP_a^u$. The first share may be a component, e.g., the first or random component of an ElGamal encryption, e.g., $g^r$. Although using an asymmetric homomorphic cryptographic encryption scheme is efficient, this is not necessary though, the shares of the encrypted identity may be according to any multi-purpose MPC algorithm, e.g., the SPDZ protocol.

User system 200 comprises a storage storing a second share 210 of the encrypted user identity. In the detailed embodiment disclosed below, the second share may be denoted as $PP_b^u$. The second share may be a component, e.g., the second or data-dependent component of an ElGamal encryption, e.g., $h^r$ U.

The encrypted identity, e.g., identity $PP^u=[PP_a^u, PP_b^u]$, is a generic encrypted identity. It is not specific for any particular service provider, such as service provider 300.

With only one share, either first share 110 or second share 210, one cannot make use of the encrypted identity. The authentication system and user system will need to cooperate to make use of the encrypted identity, e.g., to derive a blinded encrypted identity therefrom.

The identity U of the user may be encrypted with a master public key, e.g., h corresponding to some master private key, e.g., x. The encrypted identity shares may be provided by some trusted party, e.g., a government agency. For example, the identity may be a social security number or the like. The identity may be a telephone number, or SIM number, and may be provided, e.g., by a trusted party such as a telecom provider or the like. The identity may be provided in encrypted form by the trusted party, or in the form of a share of the encrypted identity. FIG. 2 shows a master system 400. Master system 400 may enroll the authentication system, the service providers and/or the user systems. In particular, the master system may choose a public master key and a private master key.

For example, in an embodiment, the master system may choose a public master key and a private master key. The master system may use it to encrypt or have encrypted an identity of each user system. A share in the encrypted identity is then sent to the user system and another share is sent to the authentication system.

Although, computing encrypted identities at a trusted party, such as the key master system, is a convenient way to enroll, there are several alternatives.

For example, as a first alternative, the identity U may be chosen by the user himself. In this case, the two shares may be computed by the user, of which he keeps one and sends the other to the authentication system. After sending the share, it is preferably deleted from the user's system.

As a second alternative, the user system 200 and authentication system 100 may engage in a multi-party computation to jointly compute the encrypted identity. For example, the authentication system and the user system may be arranged to jointly encrypt a user identity U for the public master key h so that each obtains a share of the encrypted user identity. The multi-party computation may take from user system 200 the user identity U as a private input, so that the authentication system 100 does not need to learn the identity U.

However, in many envisioned practical systems, such a joint computation is not needed, and the shares of the encrypted identity will be obtained from a trusted party. One or both of the shares may be associated with a unique number which is also associated with the user system. For example, the unique number may be an application ID (e.g. AppId) which distinguishes the user system 200 from other user systems. The application ID may be a number, e.g., a serial number, random number, etc., which may be chosen by the user system 200 or the trusted party, etc. The unique number may be primarily used for bookkeeping and might not be suitable for logging in to the service provider.

Both the authentication system and the user system comprise a communication interface to communicate with each other and with other parties, e.g., the service provider, as needed. For example, the communication may be over a computer network, e.g., the Internet. Generally speaking, the communication within and between systems 100, 200 and 300 may be cryptographically protected for integrity and/or confidentiality using conventional means, e.g., https, the SAML protocol, SLL, TLS, etc.

When the user system needs to log-in, or sign in, to a service of the service provider, e.g., over the computer network, e.g., a log-in to a website, service provider 300 selects a challenge 310, also denoted e. The challenge may be randomly selected. The challenge is sent in unblinded form to user system 200 and in blinded form to authentication system 100. The blinded form is useful in that computations based on the challenge may be verified using the blinded challenge. Furthermore, the blinded challenge may be used to bind other parties to the correct value of the challenge 310. The blinded challenge may thus prevent session hijacking or replay attacks.

Note that the blinded and unblinded challenge may be protected using conventional cryptographic-protection means, e.g., encrypted with a public key of user system 200 and/or signed with a private key of service provider 300. Blinding the challenge may be done by using the challenge in the exponent of the master public key, e.g., as $h^e$, or $h^{f(e)}$ for some function $f$.

The blinded challenge may be received from the service provider, e.g., from a website, in the form of a redirect. Receiving the challenge from the service provider may be done by receiving it from the website directly, in an electronic communication, or through an optical communication. For example, the service provider may show the challenge in the form of a bar code, e.g., a linear bar code, or a two-dimensional bar code, e.g., a QR code. The optical code may be read by a device of user system 200, e.g., by a smartphone equipped with a camera.

Once the authentication system has the blinded challenge and the user system has the unblinded challenge, they may engage in a protocol to obtain a blinded encrypted identity. The blinded encrypted identity is not directly used to authenticate, but is an intermediate product. Because it is blinded with a challenge which is unknown to the authentication system 100, it is safe to allow the authentication system to perform computations on it.

User system 200 and authentication system 100 together jointly blind the encrypted user identity for the challenge e. For example, the authentication system may comprise a joint blinding unit 120 that has access to the first share, and the user system may comprise a joint blinding unit 220 that has access to the second share. The joint blinding units 120 and 220 are configured to cooperate and to jointly compute a blinded encrypted identity.

The joint blinding may be a so-called multi-party computation in which the parties may have private inputs. After the computation concludes, those parties should not know more than they can derive from their own inputs that they started out with and the outcome that they legally obtain. Preferably, the parties should also be able to verify that the other party performed its actions correctly. If a sufficient number of the parties are compromised, then these goals may not be fully realizable.

The authentication system 100 will obtain as a result of the computation the blinded encryption identity. Preferably, he should be able to verify, e.g., using his blinded challenge, that the blinded encryption identity was correctly computed. The authentication system should preferably be unable to derive, e.g., the full encrypted identity from his first share, the blinded challenge and the blinded encrypted identity.

For user system 200 this is also desirable, but it is less important if the user system is capable of deriving his own encrypted identity. It is his own identity, so it is in his interest to protect it well. Moreover, he is not a target where many identities may be available, as the authentication system is, e.g., a single-point of breach. In this case, the encrypted identity may be blinded by exponentiation of the encrypted identity with the challenge e. The blinded encrypted identity may be referred to as $BPP^u$. It may be computed as $(PP^u)^e$.

In an embodiment, the authentication system may receive the blinded challenge from the service provider through the user system. For example, the blinded challenge may be forwarded by the user system to the authentication system. This avoids that direct communication needs to be established between the authentication system and the service provider, and thus eliminates potential attacks points. For example, the blinded challenge may be forwarded to the authentication system in the form of a redirect. For example, the user system may comprise a browser, and the authentication system and service provider may comprise a web server. With a redirect from the service provider website to the authentication system website a blinded challenge may be forwarded. The completed specific encrypted identity may be returned from the authentication system to the service provider in the same way.

In an embodiment, the user system could also compute the blinded challenge itself. For example, the user system may receive an unblinded challenge e and use it to compute the blinded challenge, and forward this to the authentication system. The user system cannot simply pick its own challenge, since the resulting identity would not be accepted by the service provider. However, in an embodiment this may be used so that a device of the user system can prove to the authentication system that it knows the unblinded challenge. This may be advantageously used in split user systems, Instead of providing the user system 200 with the unblinded challenge e, in a variant both the user system 200 and the authentication system 100 are provided with a share in the challenge by the service provider. In this way, the unblinded challenge does not need to leave the service provider. This reduces the risk that an attacker may obtain the challenge e and the blinded encrypted identity, from which he may compute the encrypted identity itself. In the variant, the blinded encrypted identity is jointly computed using the shares in the challenge as well as the shares in the encrypted identity as private inputs. This may be done using ElGamal. However, if ElGamal is not used, other multi-party computations may be used. For example, a challenge may be a bit string generated by the service provided and used as a one-time pad, e.g., by XOR-ing; Each of the authentication system and the user system may receive a share in the one-time pad. Computing the blinded encrypted identity may then be done using a generic MPC protocol. This has the benefit that an attacker who knows the challenge, e.g., through the user, and who observes the BPP or BEP, cannot find the PP or EP. For example, the BPP could be calculated using a multi-party computation without obtaining the PP from knowledge of only one of the challenge shares. Specifically, one may use the following protocol:

Server (share c_s and PPb) sends $A=PPb^{e\_s}$ to client,
Client (share e_c and PPa) computes $B=A^{e\_c}$ and $C=PPa^{e\_c}$ and sends B, C back to Server. Finally, the server calculates: $BPP=B, C^{e\_s}$ An attacker on the Server cannot obtain PPa without knowledge of e_c and on client cannot obtain PPb without knowledge of e_s. Elsewhere the attacker cannot derive PP from BPP without knowledge of both e_s and e_c.

An outcome of the joint blinding may be that the authentication system 100 has access to the blinded encryption identity. He may use the blinded encryption identity for various purposes as further detailed below. Moreover, the blinded encrypted identity is bound to challenge e so that, even if an attacker obtained it, it will be useless since in a next session, the service provider will pick a different e.

For example, in an embodiment the authentication system 100 may compute an encrypted identity from the blinded encryption identity which is specific for the service provider. To this end, the authentication system may comprise an encrypted identity unit 130. In particular, the specific encrypted identity may be decryptable using a private key of the service provider and the challenge e so that the service provider obtains a valid identity for the user. In an embodiment, the specific encrypted identity is protected for integrity, e.g., by signing it using a public key of the authentication system. If this is done, then the specific encrypted identity not only provides an identity but also provides authentication. For example, the specific identity is timely since it is bound to the session challenge, and the signature proves that it was made by authentication system 100. This in turn implies that it was made together with a user system that had access to an appropriate share of the generic encrypted identity.

Note that in embodiments, it may be allowed that the service provider cannot verify that the specific encrypted identity belong to an actual identity U.

There are at least two types of encrypted identities that can be computed from a blinded encrypted identity. Both are decryptable by the service provider using its private key and the challenge. That is, both types are encrypted identities specific for the service provider 300. The first type of encrypted identity can be decrypted by the service provider to obtain the actual identity of the user U. The second type of encrypted identity can be decrypted by the service provider to obtain a pseudonym of the user. Although the pseudonym is different from the identity U itself it is the same if the authentication is performed twice. In other words, the pseudonym is perfectly usable as a username or the like. However, the pseudonym is different for different service providers. The identity of the user U and one of its pseudonyms may be related through a one-way function. For example, the one-way function may take as input the identity U, and the identity of the service provider. Further inputs are possible, e.g., a local key seed, which may be random but fixed. Computing the encrypted identity for the service provider may further depend on a public key of the service provider, or cryptographic system data that allows decryption by a private key of the service provider. This may be obtained using the homomorphic property of the underlying encryption scheme. For example, the authentication scheme may add the encryption of the service provider, while leaving the blinding in. The blinded encryption identity may even be encrypted with a public key of the authentication system for additional security, e.g., this may be done during the joint computation, e.g., to prevent a leaked blinded encrypted identity from doing any good to an attacker who somehow knows the challenge. While the authentication system 100 adds the encryption of the service provider, it may remove its own encryption. This is not needed though, especially not, if a base security such as TLS is used.

For example, in an embodiment, computing the encrypted identity may comprise encrypting at least a component of the blinded encrypted user identity, the encrypting being arranged for the encrypted identity to be decryptable using a private key of the service provider. For an encrypted identity that decrypts to the actual identity this may be sufficient. For example, a second component may be equal to the second component of the blinded encrypted identity. In this case, the encrypted identity specific for the service provider need not be pseudonymous. For example, the encryption identity is modified from being encrypted by the master public key to being encrypted by the service provider public key; all the while staying in blinded form.

To get an encrypted identity for the service provider that decrypts to a pseudonym, the authentication system could further blind with a value derived from the service provider identity (N). For example, the value may be obtained using a key derivation function, a hash function or the like. The derivation may depend on a local secret key seed.

In an embodiment, the authentication system may store a transformation key seed, the service provider having been provided with a private key computed from the transformation key seed and a service provider identity. Using the transformation key seed, the authentication system can correctly encrypt so that decryption will be possible by the service provider. The service provider private key may be derived from the transformation key seed and the master private key. The authentication system may get access to the transformation key seed and the master public key, and be configured to transform data that is encrypted for the master private key to data that is encrypted for the service provider private key.

The encrypted user identity that is now specific for a service provider can be sent to the service provider. This can be done directly, or through the user system, e.g., through a redirect. The user system may use the encrypted user identity to authenticate to the service provider with the encrypted identity. For example, additional authentication measures may be added, e.g., a signature of the authentication system and/or a signature of the user system.

FIG. 3 schematically shows an example of an embodiments of an authentication system 101, a user system 201, a service provider 300 and a master system 400. This embodiment is similar to embodiments described with reference to FIG. 2, except that user system 202 is split into two parts, e.g., embodied by a first user device 270 and a second user device 280.

First user device 270 comprises a communication interface arranged to communicate with the service provider and the authentication system, the first user device being arranged to receive the blinded challenge ($h_e$), to forward the blinded challenge to the authentication system, and to receive the specific encrypted identity.

First user device 270 may act as a conduit between authentication system 100 and service provider 300. For example, in an embodiment, the user device 270 may be a web browser, with which a user can use the services of the service provider, and thus with which he wants to log-in. In an embodiment, first user device 270 does not get access to the unblinded challenge e nor to a share in the encrypted identity.

Second user device 280 comprises a communication interface arranged to communicate with the service provider and the authentication system, the second user device being arranged to receive the unblinded challenge e and to jointly compute the blinded encrypted identity. For example, second user device 280 may comprise the joint blinding unit 220.

For example, the unblinded challenge may be obtained in a digital communication. This may be wired or wireless message over a computer network, but may also be an optical message. The optical message may be displayed on a screen of the first device, e.g., as caused by the service provider, and may then be captured by a camera of the second device. After decoding of the image, the unblinded challenge is available on the second device.

The second device comprises a storage storing the second share of the encrypted user identity ($PP_b^u$).

In an embodiment, the second device 280 engages with the authentication system to jointly compute the blinded encrypted identity. The blinded encrypted identity may then be used by the authentication system to compute the desired type of specific encrypted identity. The specific encrypted identity may be forwarded to the service provider via the first user device so that the first user device can log-in to the service provider. Interestingly, the second user device 280 can prove to the authentication system that second user device 280 corresponds to first user device by computing the blinded challenge and sending it to the authentication system 100. The authentication system can verify that it is the same as the blinded challenge received from the first user device 270.

A split user system may also be used when the challenge is communicated in shares. For example, first user device 270 may receive a first share of the challenge from service provider 300 and forward it to the authentication system. Second user device 280 may receive a second share of the challenge. Using both shares the blinded encryption identity can be jointly computed, without any of the authentication system and user system learning the challenge, e.g., using a cryptographic multi-party computation. One may complement this with some other mechanism to prove the relationship between the first and second user device, e.g., a challenge response protocol based on a challenge of either the service provider or the authentication system. Alternatively, the second user device may receive from the service provider the blinded challenge $h_e$, e.g., optically. The second user device can forward this value, while also jointly computing the blinded encrypted identity from their shares. In this way, the relationship between the first and second user device can also be proven; the jointly computed blinded encrypted identity may be verified using the blinded challenge he received from the service provider, e.g., through the first user device.

In an embodiment, the second user device 280 is configured to jointly compute the blinded encryption identity. The first user device 270 is configured to authenticate to the service provider with the specific encrypted identity. This split has various advantages. For example, the second user device 280 may be used with multiple user devices 270; for example, the second user device 280 may be a smartphone running appropriate software, e.g., an app. Moreover, a better separation between the unblinded challenge and the blinded encrypted identity is obtained.

Both the first user device as the second user device may implement user authentication and/or access systems to avoid unauthorized access, e.g., entering a PIN code, a biometric, a password, etc.

The first and second user devices are preferably distinct software units and more preferably different devices. The second user device might be the user phone, e.g., an app running on a portable device of the user. The first user device may be a desktop computer. The same second device may be used with many first devices, e.g., computers. The first device may be a mobile device as well. The first and second user device may be embedded in the same device though. For example, in an embodiment both the first and second user device may be implemented as applications on the same smartphone. In that case, it is preferred that the first and second user device have an independent connection to the service provider and/or authentication server so that one can receive information that the other does not have access to, e.g., the blinded or unblinded challenge, the blinded encrypted identity, and the specific encrypted identity.

FIG. 4 schematically shows an example of an embodiment of an authentication system 102, a user system 202, a service provider 300 and a master system 400. In FIG. 4 both the authentication system and the user device are split. Note that one could modify this embodiment, or those of FIGS. 2 and 3, so that only the authentication system is split, but not the user system.

An authentication system 102 comprises a helper server 180 and an authentication server 170. The responsibility for jointly computing the blinded encrypted identity falls to the helper server 180 and the second user device 280. For example, the helper server may store the first share of the generic encrypted user identity U. Furthermore, the helper server 180 may comprise a communication interface arranged to receive the blinded challenge. The blinded challenge may come from the service provider, possibly through another device, such as the authentication server 170 and/or the first user device 270. The helper server is configured to jointly blind with the user system, in particular the second user device 280, the encrypted user identity obtaining the blinded encrypted user identity. For example, helper server 180 may comprise the joint blinding unit 120. The blinded encrypted user identity may be sent from the helper server to the authentication server. The authentication server can then compute the desired specific encrypted identity for the service provider of the desired type. For example, authentication server 170 may comprise the encrypted identity unit 130.

Interestingly, the helper server may learn some identity of the user, or at least some proxy therefore, such as an application id. However, the helper server does not need to learn the identity of the service provider. In fact, the helper server does not need to have any direct contact with the service provider at all. Although the blinded challenge may come from the service provider, e.g., through the first user device and the authentication server, the identity of the service provider does not need to be included once the helper server learns the blinded challenge.

The authentication server may receive the blinded encrypted identity and use it to derive a specific encrypted identity for the service provider.

Service providers, e.g., as described with reference to FIGS. 2-4, may comprise a storage, and a communication interface. The storage may store a private key, which may be used to decrypt an encrypted identity, thus obtaining either an identity U or a pseudonym. The storage could also be used to temporarily store a challenge. The communication interface may be configured to communicate at least with the user system, e.g., at least with user device 270. For example, in an embodiment, the service provider may comprise a web server which is served through the communication interface.

The service provider may be configured to generate a challenge e and to compute a blinded challenge corresponding to the challenge. For example, this may be done when a log-in request is received. The challenge may be encoded in an optically readable image, so that it can be read by the user system optically, e.g., by second device 280. The blinded challenge may be sent to the user system, e.g., to first user device 270, and from there to the authentication system. For example, the blinded challenge may go from the service provider to the first user device to the authentication server to the helper server.

In the end the service provider receives an encrypted identity which it may decrypt with the private key and unblind with the challenge (e). In addition to this, the service provider may verify other authentication tokens, e.g., a signature by the helper server and/or authentication server. For example, the helper server may sign the blinded challenge. For example, the authentication may sign the specific encryption identity.

In the various embodiments of the authentication system, user system, service provider, authentication server, helper server, first user device and second user device, a communication interface may be selected from various alternatives. For example, the interface may be a network interface to a local or wide area network, e.g., the Internet. In case two devices are in the same system, they may communicate through an application interface (API), etc.

The authentication system, user system, service provider, authentication server, helper server, first user device and second user device may have a user interface, which may include well-known elements such as one or more buttons, a keyboard, display, touch screen, etc. The user interface may be arranged for accommodating user interaction for performing a log-in action, reading a challenge, entering a PIN code, and so on.

Storage in the devices may be implemented as an electronic memory, say a flash memory, or magnetic memory, say hard disk or the like, or optical memory, e.g., a DVD. Storage may comprise multiple discrete memories together making up the storage.

Typically, the authentication system, user system, service provider, authentication server, helper server, first user device and second user device, device each comprise a microprocessor which executes appropriate software stored at the systems and/or devices; for example, that software may have been downloaded and/or stored in a corresponding memory, e.g., a volatile memory such as RAM or a non-volatile memory such as Flash. Alternatively, the systems or devices may, in whole or in part, be implemented in programmable logic, e.g., as field-programmable gate array (FPGA). The systems or devices may be implemented, in whole or in part, as a so-called application-specific integrated circuit (ASIC), e.g., an integrated circuit (IC) customized for their particular use. For example, the circuits may be implemented in CMOS, e.g., using a hardware description language such as Verilog, VHDL, etc.

Embodiments may comprise one or more electronic circuits to implement the corresponding units described herein. The electronic circuits may comprise a processor circuit and storage circuit, the processor circuit executing instructions represented electronically in the storage circuit.

A processor circuit may be implemented in a distributed fashion, e.g., as multiple sub-processor circuits. A storage may be distributed over multiple distributed sub-storages. Part or all of the memory may be an electronic memory, magnetic memory, etc. For example, the storage may have volatile and a non-volatile part. Part of the storage may be read-only. For example, a device may have one or more processors or microprocessors to execute software stored at the device. The circuits may also be, FPGA, ASIC or the like.

Some examples herein use the ElGamal encryption scheme. ElGamal is convenient since it has the homomorphic property. ElGamal provides an efficient way to re-encrypt a ciphertext to a new one encrypting the same data. Semantic security of ElGamal implies that any observer is unable to determine whether two cipher texts are encryptions of the same identity. The examples may however be appropriately modified for another encryption scheme. Instead of ElGamal, other asymmetric, homomorphic encryption schemes may be used, in particular, other probabilistic encryption schemes. Another example of a homomorphic encryption scheme is for example Paillier. However, even non-homomorphic encryption schemes may be used. For example, cipher texts may be modified by sharing the private key among multiple parties and using a multi-party computation to modify the ciphertext without any of the parties learning the decryption or the private key.

For example, the encryption may be according to a probabilistic encryption scheme, for example, the scheme may be ElGamal. If the encryption is probabilistic, there are many different cipher texts encrypting the same identity.

Below a specific embodiment is disclosed based on the ElGamal encryption scheme. The example uses a key management authority (KMA), e.g., master server 400, an authentication system, one or more service providers and a user system. It is the intention that the user system authenticates to the service providers, but at the time of enrollment it is not known yet which service providers a user may use.

In this example, the underlying encryption uses a cyclic group G of order prime p generated by g. The KMA select a master private key and master public key. Let $h=g^x \in G$ be the master public key and $x \in \mathbb{Z}_p$ the corresponding master private key of the ElGamal cryptosystem. Let $\mu: \{0,1\}^* \to G$ be a function that maps digital identities to an element in G in an invertible way. The KMA also selects a transformation key seed ($D_K$).

In an enrollment phase, the transformation key seed ($D_K$) is distributed to the authentication system or systems. Furthermore, the KMA computes a private key, or decryption key $x_N$ for each service provider N. For example, one may be choose $$x_N = \frac{x}{\mathcal{T}(D_K, N)},$$

where $\mathcal{T}$ is a key derivation function, e.g., a hash function. Note that the corresponding public key of N is equal to $h_N = g^{x_N} = g^{xT(D_K,N)^{-1}} = h^{T(D_K,N)^{-1}}$.

For each user a Polymorphic Pseudonym is computed. A Polymorphic Pseudonym of user $U = \mu(u)$ is an ElGamal encryption of U. i.e., $$PP^u = [PP_a^u, PP_b^u] = [g^r, h^r U], \tag{1}$$

for some randomly chosen $r \in \mathbb{Z}_p$. A Polymorphic Pseudonym is an encrypted user identity; in this case an ElGamal encryption of the user identity U.

Interestingly, the PPs are split between a user system and an authentication system. In this way a PP is not stored on either the user system or the authentication system. Accordingly, if an attacker breaks into either one of the user system and the authentication system, he will not find PPs. For example, the $PP^u$ may be shared between the Authentication Server (authentication system) and User (U) as follows. The authentication system stores as a first share $PP_a^u = g^r$, and the user stores as a second share $PP_b^u = h^r U$. Now, authentication system has only the random part of the PP, hence no information about U or $PP^u$ can be deduced. The User on the other hand has only $h^r U \in G$. The value $PP_b^u$ contains no information about U, since for any U' there exist r' so that $PP_b^u = h^{r'} U'$. Thus, from only the first share or only the second share no information can be derived on the full encrypted user identity.

There are several ways in which the PPs can be split between an authentication system and a user system. For example, in an embodiment a trusted party, e.g., the KMA, may compute the PPs and send a share, e.g., a component, to each of the authentication system and the user system. It is not needed that this is done by the KMA, since only the public master key h is needed. For example, in an embodiment, an enrollment device encrypts social security numbers using the public master key h, and sends a share to the authentication system and the user system. In an embodiment, a user could compute the PP. For example, a user could select an identity for itself, e.g., a full name, or the like and compute the PP from it. Afterwards, one share may be kept by the user, and one share may be sent to the authentication system. A split PP may also be computed using a multi-party computation, e.g., between the authentication system and the user system.

After enrollment, in a use phase, a user system may need to authenticate to a service provider. In the following protocol, the Service provider may generate a challenge e and send the challenge e to the user system. Typically, the challenge will be generated randomly. The service provider sends the authentication system a blinded challenge $h_e := g^e$. The user system and authentication system will jointly blind the encrypted user identity for the challenge e to obtain $$BPP^u = [BPP_a^u, BPP_b^u] := (PP^u)^e = [(PP_a^u)^e, (PP_b^u)^e], \tag{5}$$

For example, this can be done using a multi-party computation. In the multi-party computation, the user system has access to one share of the PP, and to the challenge e, whereas the Authentication Server (AS) has access to the other share of the PP and the blinded challenge. As a result, at least the authentication server obtains the blinded encrypted user identity $BPP^u$. The user system may gain access to the blinded encrypted identity, but this neither needed nor desirable. Preferably, none of the parties to the multi-party computation learn information on the full PP, in particular not the authentication system. Furthermore, the authentication system does not learn the unblinded challenge e. Preferably, the protocol also proves to the authentication system that the user system has access to the unblinded challenge e. The latter may be done via a Zero Knowledge proof of Knowledge, e.g., as part of the MPC. A Zero Knowledge proof may use the so-called Fiat-Shamir heuristic [4], based on a hash function $\mathcal{H}$.

Jointly computing the blinded encrypted identity may be done according to known multi-party computation protocols. However, an optimized protocol is as follows:

User gets random challenge from Service Provider: Service provider generates and sends random $e \in {}_R\mathbb{Z}_p$ to user system U and $h_e=g^e$ to authentication system.

Joint blinding of PP. The user system establishes a connection with the authentication system.

(a) randomize $PP_a^u$: authentication system picks random $c \in {}_R\mathbb{Z}_p$ and sends $C=(PP_a^u)^c$ to user U. (NOTE: the user will not be able to reconstruct $PP_a^u$ without knowledge of c)

(b) transformation to e: U computes $A=C^e$ and $B=(PP_b^u)^e$.

(c) Proof of Session Ownership: U picks random $r \in {}_R\mathbb{Z}_p$ and computes $a=C^r$, $b=g^r$, $z=\mathcal{H}(a\|b)$ and $\rho=r+ze$ mod p.

(d) reply to authentication system: U sends A, B, a, b, ρ to authentication system (e) verify proof: authentication system computes $z=\mathcal{H}(a\|b)$ and verifies whether $(C)^\rho == aA^z$, and $g^\rho == bh_e^z$.

The authentication system now knows that the user system has access to a challenge e such that $h_e=g^e$ and that A equals $C^e$.

(f) finish blinded reconstruction: authentication system set $BPP^u = [A^{c^{-1}}, B]$.

During this protocol, no party ever sees a complete $PP^u$. Furthermore, $BPP^u$ can be used only in a session indexed by challenge e, hence it is useless to an attacker since the range of e is very large in the Discrete Log setting.

Once the Authentication system has access to the blinded encrypted identity $BPP^u$, the authentication system can compute one of two values.

A blinded encrypted identity BEI of user U is an ElGamal encryption of $U^e$ under the ElGamal key of some service provider. So the EI for user U w.r.t. service provider N is of the form $BEI_{U,N} = [g^r, h_N^r U^e]$, for some random number r. It can be computed by the authentication system given $BPP^u$ as follows $$BEI_{U,N} = [(BPP_a^u)^{\mathcal{T}(D_k,N)}, BPP_b^u] \quad (2)$$
$$= [g^{r\mathcal{T}(D_k,N)}, h^r U^e]$$
$$= [g^{r\mathcal{T}(D_k,N)}, (g^{x\mathcal{T}(D_k,N)\mathcal{T}(D_k,N)^{-1}})^r U^e]$$
$$= [g^{r'}, h_N^{r'} U^e].$$

The service provider can decrypt with his private decryption key and unblind with $d=e^{-1}$ mod p to obtain U.

An encrypted pseudonym EP of user U is an ElGamal encryption of $f(U, K, N)$ under the ElGamal key of some service provider N. One may choose $f(U, K, N)$ to be $U^{\mathcal{T}(K,N)}$ Thus, $BEP_{U,N} = [g^r, h_N^r U^{e\mathcal{T}(K,N)}]$.

This can be computed by the authentication system from BPP as follows:

$$BEP_{U,N} = [(BPP_a^u)^{\mathcal{T}(D_k,N)\mathcal{T}(K,N)}, (BPP_b^u)^{\mathcal{T}(K,N)}]. \quad (3)$$

Correctness follows from the homomorphic property of ElGamal. Note that a $BEP_{U,N}$ can be decrypted and unblinded by N since the Service provider knows e so that he can compute $d=e^{-1}$ mod p. The service provider can obtain from $BEP_{U,N}$ the value $P_{U,N}=U^{\mathcal{T}(K,N)}$. (4) The latter is a pseudonym of U which is specific for service provider N. Each time user U authenticates to service provider N, the service provider will obtain the same pseudonym. However, the service provider will not learn the corresponding value U. Even if two service providers cooperate they will find it hard to collate their information on user U since they do not know that which user pseudonym on one server corresponds to a pseudonym on another server.

Thus, the Service provider provides a random challenge to the user to encrypt his PP, resulting in what we call BPP. This encryption ensures that the BPP is unusable in any other context. The protocol does not require the parties to ever see a complete PP, but at most a BPP.

If the authentication server is implemented as a single device, then the authentication server may still obtain profiling information, i.e., the server may learn some form of ID connected to the user as well as the ID of the Service provider the user is contacting. In an embodiment, this is avoided by performing the reconstruction of BPP on a separate server, the helper server, that will forward the reconstructed BPP to an authentication server that can transform and send the result to the service provider. Hence, the separate server will only learn that a "certain user wishes to use his PP" and the authentication server will only learn that "someone wishes to contact certain Service provider".

In an embodiment, the authentication system is assured that the user system has used the correct challenge corresponding to a valid session. In this way attackers that try to forge a BPP encrypted with a key of their own choice are thwarted. Zero-Knowledge proofs may be applied for that part. Furthermore, the proofs may be enhanced to prove authenticity of the user's identity as well. The latter avoids having to do yet another proof.

Splitting the PP over two parties and joint blinding removes that PPs as a target. The authentication system may still learn though that a user indexed by the share $PP_a^u$ wishes to connect to service provider N. In an embodiment, this is avoided by splitting the computation of $BBP^u$ and the use of the $BBP^u$ to compute $BEP_{U,N}$ or $BEI_{U,N}$ to two different servers: the helper server and the authentication server.

No shares are stored on the authentication server (AS) so that the AS only sees $BBP^u$'s which are unlinkable to certain user interactions. The user system may perform reconstruction of BPP with the help the Helper Server (HS) that forwards the reconstructed BPP to the authentication server. Then the helper server only learns "a user with $PP_a^{u}$" desires to use his PP, while the authentication server only learns "someone wants to authenticate to service provider (N)".

The following protocol may be used:

User system gets random challenge from service provider. Service provider generates and sends random $e \in {}_R\mathbb{Z}_p$ to user U and $h_e=g^e$ to AS. The user system connects to the helper server. The authentication server forward the $h_e$ to the helper server. The blinded challenge $h_e$ may also be sent directly to the helper server.

Joint Blinding of PP
- (a) randomize $PP_a^u$: HS picks random $c \in_R \mathbb{Z}_p$ and sends $C=(PP_a^u)^c$ to user U. (NOTE: the user will not be able to reconstruct $PP_a^u$ without knowledge of c)
- (b) transformation to e: U computes $A=C^e$ and $B=(PP_b^u)^e$.
- (c) Proof of Session Ownership: U picks random $r \in_R \mathbb{Z}_p$ and computes $a=C^r$, $b=g^r$, $z=\mathcal{H}$ (a∥b) and ρ=r+ze mod p.
- (d) reply to HS: U sends A, B, a, b, ρ to HS
- (e) verify proof: HS computes $z=\mathcal{H}$ (a∥b) and verifies whether $$(C)^\rho == aA^z,$$

and $$g^\rho == bh_e^z.$$

Now HS knows that U knows e such that $h_e=g^e$ and that A equals $C^e$.
- (f) finish blinded reconstruction: HS set $BPP^u=[A^{c^{-1}}, B]$.

Send result to AS: The HS sends $BPP^u$ to AS. Optionally, $BPP^u$ may be additionally blinded to ensure that even if e is somehow leaked, the corresponding $PP^u$'s are still unlinkable for the AS. Note that the latter optional blinding does not need a separate unblinding step. In a sense, this blinding just changes the random part of the encryption. Decryption will undo all randomization.

Transformation: The value $BPP^u$ is transformed to $BEP_{U,N}$ or $BEI_{U,N}$ and sent to the service provider.

Decryption: The service provider decrypts using his secret key and unblinds using e.

The protocol may include authentication via a challenge-response protocol but this involves additional communication, see for many examples chapter 4 and 5 of [5]. In an embodiment, authentication is added without the extra communication costs.

Method 1: Proving session ownership may rely on a hash function $\mathcal{H}$. We observe that $\mathcal{H}$ can also be a keyed hash function, for example an HMAC. Suppose that the value z is computed as follows $$z=\mathcal{H} (a\|b)=HMAC(key, a\|b\|SessionData),$$

where the server and user both have key and SessionData (which may be empty, a SessionCounter, challenge from the server, etc.). Now the "Proof of Session Ownership" can only succeed if the user actually has the HMAC key that the server also has, otherwise the z value computed by the user will not match the value computed by the server and the verification on the server-side will fail. Furthermore, an eavesdropper cannot compute z anymore and check whether a transcript is a "verifiable transcript", i.e., a proof that will verify.

Method 2: Alternatively, or in addition, one could use an HMAC with a pre-shared key as a PRF to blind the ElGamal encryption BPP as follows. User computes r'=HMAC(key, $g^e$∥SessionData), and computes $$A=g^{r'}C^e,$$

and $$B=h^{r'}(PP_b^u)^e,$$

instead. The other computations may remain the same.

The server on the other hand may compute r'=HMAC (key, $h_e$∥SessionData) and verify $$(C)^\rho == a(A/g^{r'})^z.$$

And in the end computes $$BPP^u=[(A/g^{r'})^{c^{-1}} g^{r'}, B].$$

This method has the additional advantage over Method 1 that the action of blinding the BPP is enforced by the protocol in order to get a valid BPP (if h remains hidden to HS). Furthermore, the server can distinguish between invalid proofs due to not having used the right key (e.g. potentially by having pressed a wrong PIN) or not having a valid session. Indeed, if key is wrong then only r' is wrong, so that only the check $$(C)^\rho == a(A/g^{r'})^z,$$

will not hold while $$g^\rho == bh_e^z$$

does still hold. But if e is wrong then z is wrong so that both verifications will fail.

Below a further embodiment is described in which the user system is split in a first user device and a second user device: e.g., a user browser, e.g., running on a desktop, and a user application (App), e.g., running on a user smartphone. The authentication system is split in a helper server and an authentication server. The App may be registered with the helper server with an app identity, e.g., the app id. The share of the encrypted identity may be stored on the helper server associated with the app id. The helper server and app may both maintain a session counter.

1. User connects to service provider via a web browser.
2. User requests a service and wishes to login.
3. Service provider provides the random challenge e to the user application. For example, the service provider may show a optically readable code, say a QR-code, of the random challenge e, say, via a popup window. The user browser is redirected to the Authentication Server, where Authentication Server gets $h_e=g^e$ as session id. The redirection may use standard SAML redirection.
4. AS stores $h_e$ with the identity of the service provider N, then forwards $h_e$ to the Helper Server.
5. Helper Server adds $h_e$ to a list of open sessions.
6. User opens an application (App), e.g., "ClientSoftware" to read the challenge, e.g., scan the QR code.
7. App connects to Helper Server with his app id, AppID, and $h=g^e$.
8. Helper Server verifies existence of a free session with value $h_e$=h.
9. Helper Server fetches $PP_a^u$ corresponding to AppID and links $h_e$ to AppID. Now $h_e$ is not free anymore.
10. Helper Server picks random $c \in_R \mathbb{Z}_p$ and replies with $C=(PP_a^u)^c$.
11. User enters an access code, e.g., a PIN.
12. App fetches seed and e and SessionCounter.
13. App computes KU=H (seed∥PIN), and r'=HMAC (KU∥$g^e$∥sessionCounter).
14. App computes $A=g^{r'}C^e$ and $B=h^{r'}(PP_b^u)^e$.
15. App picks random $r \in_R \mathbb{Z}_p$ and computes $a=C^r$, $b=g^r$, $z=\mathcal{H}$ (a∥b) and ρ=r+ze mod p.
16. App sends AppID, A, B, a, b, ρ to Helper Server
17. Helper server fetches KU and sessionCounter corresponding to AppID and computes r'=HMAC(KU, sessionCounter).
18. Helper Server computes $z=\mathcal{H}$ (a∥b) and verifies whether $$(C)^\rho == a(A/g^{r'})^z,$$

and $g^p == bh_e^z$.

19. If only the second check is true, then conclude "Incorrect PIN", if both are false then conclude "Malicious Message Received". Else if both are true: continue.

20. The Helper Server sets $BPP'' = [(A/g'')^{c^{-1}} g'', B]$.

21. The Helper Server sends $BPP''$ to the Authentication Server as well as $h_e$ and the conclusion of authentication.

22. The Helper Server increments SessionCounter and replies to App with conclusion.

23. App increments SessionCounter and shows conclusion to user.

24. The Authentication Server fetches the ID of the service provider corresponding to session identified with $h_e$.

25. The Authentication Server requests BSNk to transform $BPP''$ (playing the role of PI in FIG. 1) via Eq. (3) into $BEP_{U,N}$ (playing the role of VI in FIG. 1).

26. The Authentication Server redirects browser back to relying Party with $BEP_{U,N}$.

27. The service provider decrypts $BP_{U,N}$ using his secret key and reconstructs $P_{U,N} = BP_{U,N}^{e^{-1}}$.

28. The user is authenticated.

Many elements of this embodiment are optional and/or can be replaced by alternatives. For example, the use of a session counter or a PIN code is optional. For example, in step 13 it is optional to use KU, a session counter or the HMAC, etc. The seed in step 13 may be a random string that is generated by the App, e.g., at enrollment, e.g., when entering a PIN for the first time. The seed protects a database on the server containing KU values to leak PINs on a large scale by rainbow table attacks.

Figure 5:
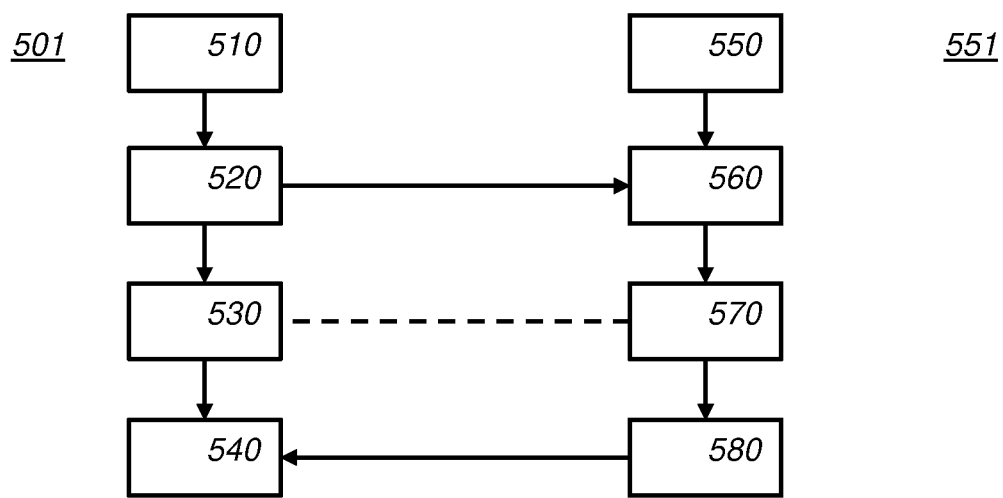

FIG. 5 schematically shows an example of embodiments of authentication methods. FIG. 5 shows an overall method 500 comprising a method 501 for a user system and a method 551 for an authentication system. The invention extends to parts of the methods which may be executed, e.g., by a helper server, authentication server, a first user device and a second user device. The invention further extends to methods that may be executed by the service provider.

Method 501 comprises
  storing 510 a second share of an encrypted user identity,
  receiving 520 a blinded challenge and an unblinded challenge generated by the service provider. The blinded challenge may be forwarded to the authentication system, as indicated by the right-pointing arrow in FIG. 5,
  jointly blinding 530 with an authentication system an encrypted user identity for the challenge. The joint blinding is indicated by the dashed line in FIG. 5
  receiving 540 a specific encrypted identity and authenticating to the service provider.

Method 551 comprises
  storing 550 a first share of an encrypted user identity,
  receiving 560 the blinded challenge corresponding to a challenge generated by the service provider,
  jointly blinding 570 with a user system the encrypted user identity for the challenge
  computing 580 an encrypted identity for the service provider and sending the specific encrypted identity to the user system. This is indicated with a left-pointed arrow in FIG. 5.

Many different ways of executing the methods are possible, as will be apparent to a person skilled in the art. For example, the steps can be performed in the shown order, but the order of the steps may also be varied or some steps may be executed in parallel. Moreover, in between steps other method steps may be inserted. The inserted steps may represent refinements of the method such as described herein, or may be unrelated to the method. For example, some steps may be executed, at least partially, in parallel. Moreover, a given step may not have finished completely before a next step is started.

Embodiments of the method may be executed using software, which comprises instructions for causing a processor system to perform method 500. Software may only include those steps taken by a particular sub-entity of the system. The software may be stored in a suitable storage medium, such as a hard disk, a floppy, a memory, an optical disc, etc. The software may be sent as a signal along a wire, or wireless, or using a data network, e.g., the Internet. The software may be made available for download and/or for remote usage on a server. Embodiments of the method may be executed using a bitstream arranged to configure programmable logic, e.g., a field-programmable gate array (FPGA), to perform the method.

It will be appreciated that the invention also extends to computer programs, particularly computer programs on or in a carrier, adapted for putting the invention into practice. The program may be in the form of source code, object code, a code intermediate source, and object code such as partially compiled form, or in any other form suitable for use in the implementation of an embodiment of the method. An embodiment relating to a computer program product comprises computer executable instructions corresponding to each of the processing steps of at least one of the methods set forth. These instructions may be subdivided into subroutines and/or be stored in one or more files that may be linked statically or dynamically. Another embodiment relating to a computer program product comprises computer executable instructions corresponding to each of the means of at least one of the systems and/or products set forth.

Figure 6A:
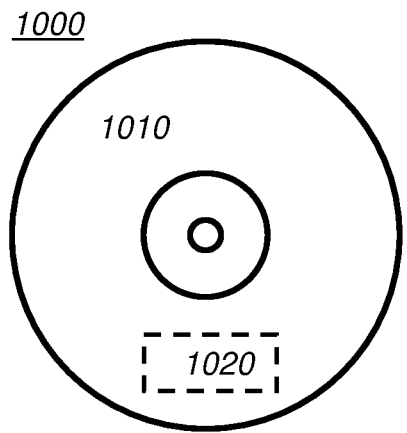

FIG. 6a shows a computer readable medium 1000 having a writable part 1010 comprising a computer program 1020, the computer program 1020 comprising instructions for causing a processor system to perform an authentication method, according to an embodiment; for example method 500, 501, 551 or parts thereof. The computer program 1020 may be embodied on the computer readable medium 1000 as physical marks or by means of magnetization of the computer readable medium 1000. However, any other suitable embodiment is conceivable as well. Furthermore, it will be appreciated that, although the computer readable medium 1000 is shown here as an optical disc, the computer readable medium 1000 may be any suitable computer readable medium, such as a hard disk, solid state memory, flash memory, etc., and may be non-recordable or recordable. The computer program 1020 comprises instructions for causing a processor system to perform said authentication method.

Figure 6B:
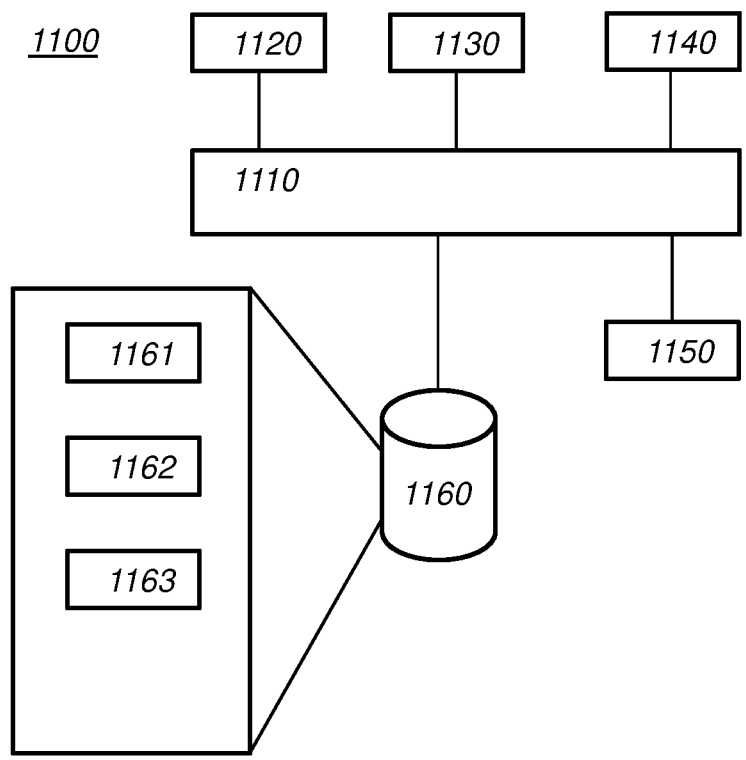

FIG. 6b illustrates an exemplary hardware diagram 1100 for implementing a device according to an embodiment. For example, hardware diagram 1100 may be configured to implement one or more of an authentication system, user system, authentication server, first user device, second user device, or service provider. As shown, the device 1100 includes a processor 1120, memory 1130, user interface 1140, communication interface 1150, and storage 1160 interconnected via one or more system buses 1110. It will be understood that this figure constitutes, in some respects, an abstraction and that the actual organization of the components of the device 1100 may be more complex than illustrated.

The processor 1120 may be any hardware device capable of executing instructions stored in memory 1130 or storage 1160 or otherwise processing data. As such, the processor may include a microprocessor, field programmable gate array (FPGA), application-specific integrated circuit (ASIC), or other similar devices. For example, the processor may be an Intel Core i7 processor, ARM Cortex-R8, etc. In an embodiment, the processor may be ARM Cortex MO.

The memory 1130 may include various memories such as, for example L1, L2, or L3 cache or system memory. As such, the memory 1130 may include static random access memory (SRAM), dynamic RAM (DRAM), flash memory, read only memory (ROM), or other similar memory devices. It will be apparent that, in embodiments where the processor includes one or more ASICs (or other processing devices) that implement one or more of the functions described herein in hardware, the software described as corresponding to such functionality in other embodiments may be omitted.

The user interface 1140 may include one or more devices for enabling communication with a user such as an administrator. For example, the user interface 1140 may include a display, a mouse, and a keyboard for receiving user commands. In some embodiments, the user interface 1140 may include a command line interface or graphical user interface that may be presented to a remote terminal via the communication interface 1150.

The communication interface 1150 may include one or more devices for enabling communication with other hardware devices. For example, the communication interface 1150 may include a network interface card (NIC) configured to communicate according to the Ethernet protocol. For example, the communication interface 1150 may comprise an antenna, connectors or both, and the like. Additionally, the communication interface 1150 may implement a TCP/IP stack for communication according to the TCP/IP protocols. Various alternative or additional hardware or configurations for the communication interface 1150 will be apparent.

The storage 1160 may include one or more machine-readable storage media such as read-only memory (ROM), random-access memory (RAM), magnetic disk storage media, optical storage media, flash-memory devices, or similar storage media. In various embodiments, the storage 1160 may store instructions for execution by the processor 1120 or data upon with the processor 1120 may operate. For example, the storage 1160 may store a base operating system 1161 for controlling various basic operations of the hardware 1100. For example, the storage may store instructions 1162 to jointly blind with the user system the encrypted user identity for the challenge, and/or instructions 1163 to compute an encrypted identity for the service provider, etc.

It will be apparent that various information described as stored in the storage 1160 may be additionally or alternatively stored in the memory 1130. In this respect, the memory 1130 may also be considered to constitute a "storage device" and the storage 1160 may be considered a "memory." Various other arrangements will be apparent. Further, the memory 1130 and storage 1160 may both be considered to be "non-transitory machine-readable media." As used herein, the term "non-transitory" will be understood to exclude transitory signals but to include all forms of storage, including both volatile and non-volatile memories.

While device 1100 is shown as including one of each described component, the various components may be duplicated in various embodiments. For example, the processor 1120 may include multiple microprocessors that are configured to independently execute the methods described herein or are configured to perform steps or subroutines of the methods described herein such that the multiple processors cooperate to achieve the functionality described herein. Further, where the device 1100 is implemented in a cloud computing system, the various hardware components may belong to separate physical systems. For example, the processor 1120 may include a first processor in a first server and a second processor in a second server.

It should be noted that the above-mentioned embodiments illustrate rather than limit the invention, and that those skilled in the art will be able to design many alternative embodiments.

In the claims, any reference signs placed between parentheses shall not be construed as limiting the claim. Use of the verb 'comprise' and its conjugations does not exclude the presence of elements or steps other than those stated in a claim. The article 'a' or 'an' preceding an element does not exclude the presence of a plurality of such elements. Expressions such as "at least one of" when preceding a list of elements represent a selection of all or of any subset of elements from the list. For example, the expression, "at least one of A, B, and C" should be understood as including only A, only B, only C, both A and B, both A and C, both B and C, or all of A, B, and C. The invention may be implemented by means of hardware comprising several distinct elements, and by means of a suitably programmed computer. In the device claim enumerating several means, several of these means may be embodied by one and the same item of hardware. The mere fact that certain measures are recited in mutually different dependent claims does not indicate that a combination of these measures cannot be used to advantage.

In the claims, references in parentheses refer to reference signs in drawings of exemplifying embodiments or to formulas of embodiments, thus increasing the intelligibility of the claim. These references shall not be construed as limiting the claim.

The invention claimed is:

1. An authentication system comprising
    a storage,
        wherein the storage is arranged to store a first share of an encrypted user identity, and
        wherein a user system is arranged to store a second share of the encrypted user identity;
    a communication interface circuit,
        wherein the communication interface circuit is configured to communicate at least with the user system,
        wherein the communication interface circuit is configured to receive a first share of a challenge,
        wherein the challenge is generated by a service provider, and
        wherein the user system is arranged to receive a second share of the challenge; and
    a processor circuit,
        wherein the processor circuit is configured to compute a blinded encrypted user identity for the challenge in conjunction with the user system,
        wherein the blinded encrypted user identity is computed from at least first and second private inputs,
        wherein the authentication system is arranged to provide as the first private inputs the first share of the encrypted user identity and the first share of the challenge,
        wherein the user system is arranged to provide as the second private inputs the second share of the encrypted user identity and the second share of the challenge,
        wherein the authentication system is arranged to obtain the blinded encrypted user identity,
        wherein the processor circuit is configured to compute an encrypted identity for the service provider from the blinded encrypted user identity, and wherein the encrypted user identity for the service provider is decryptable using a private key of the service provider and the challenge.

2. The authentication system as in claim 1, wherein the authentication system comprises a helper server and an authentication server, the helper server comprising:
the storage; and
the communication interface circuit; and
a help processor circuit,
wherein the help processor circuit is configured to compute, in conjunction with the user system, the blinded encrypted user identity, and
the authentication server comprising:
a communication interface circuit; and
an authentication processor circuit,
wherein the authentication processor circuit arranged to compute the encrypted identity for the service provider.

3. A user system comprising a first user device and a second user device,
wherein the first user device comprises a first communication interface circuit,
wherein the first communication circuit is arranged to communicate with a service provider and an authentication system,
wherein the authentication system is arranged to store a first share of an encrypted user identity,
wherein the first user device is arranged to obtain a blinded challenge,
wherein the first user device is arranged to forward the blinded challenge to the authentication system,
wherein the first user device is arranged to receive an encrypted identity for the service provider from the authentication system,
wherein the second user device comprises:
a storage,
wherein the storage is arranged to store a second share of the encrypted user identity; and
a second communication interface circuit,
wherein the second communication interface is arranged to communicate with the service provider and the authentication system,
wherein the second user device is arranged to receive an unblinded challenge,
wherein the second user device is arranged, at least in part, to compute, jointly with the authentication system, a blinded encrypted identity based at least on the first and second share of the encrypted user identity, and the blinded and unblinded challenges, and
wherein the authentication system determines the encrypted identity for the server based on the blinded encrypted identity.

4. A helper server comprising:
a storage,
wherein the storage is arranged to store a first share of an encrypted user identity, and
wherein a user system is arranged to store a second share of the encrypted user identity;
a communication interface circuit,
wherein the communication interface circuit is configured to communicate at least with the user system,
wherein the communication interface circuit is configured to receive a blinded challenge corresponding to a challenge, and
wherein the challenge is generated by a service provider; and a processor circuit,
wherein the processor circuit is configured to compute a blinded encrypted user identity for the challenge in conjunction with the user system,
wherein the blinded encrypted user identity is computed from at least first and second private inputs,
wherein the helper server is arranged to provide as first private inputs the first share of the encrypted user identity and the blinded challenge,
wherein the user system is arranged to provide as second private inputs the second share of the encrypted user identity and the unblinded challenge,
wherein the blinding is a multi-party computation,
wherein the helper server obtains the blinded encrypted user identity, and
wherein the processor circuit is configured to send the blinded encrypted user identity to an authentication server.

5. An authentication server comprising:
a communication interface circuit,
wherein the communication interface circuit is configured to communicate at least with a helper system and a user system,
wherein the communication interface circuit is configured to receive a blinded encrypted user identity, and
wherein the blinded encrypted user identity is jointly computed by the helper server and the user system, and
a processor circuit,
wherein the processor circuit is configured to configured to compute an encrypted identity for a service provider from the blinded encrypted user identity,
wherein the encrypted identity is decryptable using a private key of the service provider and a challenge,
wherein the challenge is provided by the service provider; and
wherein the processor circuit is arranged to send the encrypted identity to the user system.

6. A second user device comprising
a storage,
wherein the storage is arranged to store a second share of an encrypted user identity, and
wherein a first share of the encrypted user identity is stored in an authentication system;
a communication interface circuit,
wherein the communication interface circuit is configured to communicate at least with a service provider and the authentication system, and
wherein the communication interface circuit is configured to receive a challenge from the service provider; and
a processor circuit,
wherein the processor circuit is configured to compute a blinded encrypted user identity for the challenge in conjunction with the authentication system,
wherein the blinded encrypted user identity is computed from at least first and second private inputs,
wherein the authentication system is arranged to provide the first private inputs,
wherein the first private inputs comprise the first share of the encrypted user identity and a blinded challenge,
wherein a user system is arranged to provide the second private inputs,
wherein the second private inputs comprise the second share of the encrypted user identity and the unblinded challenge, and wherein the authentication system obtains the blinded encrypted user identity.

7. An authentication method comprising
storing a first share of an encrypted user identity, wherein a user system is arranged to store a second share of the encrypted user identity;
establishing communication at least with the user system;
receiving a blinded challenge corresponding to a challenge,
   wherein the challenge is generated by a service provider;
computing a blinded encrypted user identity for the challenge in conjunction with the user system,
   wherein the blinded encrypted user identity is computed from at least first and second private inputs,
   wherein the authentication system is arranged to provide the first private inputs,
   wherein the first private inputs comprise the first share of the encrypted user identity and the blinded challenge,
   wherein the user system is arranged to provide the second private inputs,
   wherein the second private inputs comprise the second share of the encrypted user identity and the unblinded challenge,
obtaining the blinded encrypted user identity; and
computing an encrypted identity for the service provider from the blinded encrypted user identity,
   wherein the encrypted identity for the service provider is decryptable using a private key of the service provider and the challenge.

8. A user method comprising:
storing a second share of an encrypted user identity,
   wherein a first share of the encrypted user identity is stored in an authentication system;
establishing communication with at least with a service provider and the authentication system,
   wherein the communication interface circuit is configured to receive an unblinded challenge from the service provider;
computing a blinded encrypted user identity for the challenge in conjunction with the authentication system,
   wherein the blinded encrypted user identity is computed from at least first and second private inputs; and
providing the second private inputs,
   wherein the second private inputs comprise the second share of the encrypted user identity and the unblinded challenge,
   wherein the authentication system is arranged to provide the first private inputs,
   wherein the first private inputs comprise the first share of the encrypted user identity and a blinded challenge, and
   wherein the blinded challenge corresponds to the unblinded challenge,
   wherein the authentication system is arranged to obtain the blinded encrypted user identity.

9. A non-transitory computer-readable medium comprising a computer program, wherein the computer program, when executed on a processor, performs the method as claimed in claim 7.

10. A non-transitory computer-readable medium comprising a computer program, wherein the computer program, when executed on a processor, performs the method as claimed in claim 8.

11. The authentication system of claim 1, wherein the user system is configured to compute the first share of the challenge based on the second share of the challenge.

12. The authentication system of claim 3, wherein the user system is configured to compute the blinded challenge based on the unblinded challenge.

* * * * *